(12) United States Patent
McGuire

(10) Patent No.: US 12,532,148 B2
(45) Date of Patent: Jan. 20, 2026

(54) METHODS, DEVICES, AND SYSTEMS FOR VEHICLE TRACKING

(71) Applicant: Jonathan McGuire, Durham, NC (US)

(72) Inventor: Jonathan McGuire, Durham, NC (US)

( * ) Notice: Subject to any disclaimer, the term of this patent is extended or adjusted under 35 U.S.C. 154(b) by 0 days.

(21) Appl. No.: 17/698,111

(22) Filed: Mar. 18, 2022

(65) Prior Publication Data

US 2022/0299655 A1 Sep. 22, 2022

Related U.S. Application Data

(60) Provisional application No. 63/162,704, filed on Mar. 18, 2021.

(51) Int. Cl.
| | |
|---|---|
| *H04W 4/14* | (2009.01) |
| *H04W 4/40* | (2018.01) |
| *G01S 19/17* | (2010.01) |
| *G01S 19/32* | (2010.01) |

(52) U.S. Cl.
CPC ............ *H04W 4/14* (2013.01); *H04W 4/40* (2018.02); *G01S 19/17* (2013.01); *G01S 19/32* (2013.01)

(58) Field of Classification Search
CPC .......... G01S 19/32; G01S 19/17; H04W 4/14; H04W 4/40
See application file for complete search history.

(56) References Cited

U.S. PATENT DOCUMENTS

| | | | | |
|---|---|---|---|---|
| 2004/0230372 A1* | 11/2004 | Chang | ............ | B60R 25/302 |
| | | | | 701/468 |
| 2010/0097208 A1* | 4/2010 | Rosing | ............ | G06Q 10/087 |
| | | | | 340/572.1 |
| 2014/0183957 A1* | 7/2014 | Duchesneau | ............ | F01K 13/006 |
| | | | | 307/64 |
| 2016/0234356 A1* | 8/2016 | Thomas | ............ | H04K 3/84 |
| 2019/0126874 A1* | 5/2019 | Panigrahi | ............ | B60R 21/0132 |

OTHER PUBLICATIONS

Reaves, Brian A., Ph.D.: "Police Vehicle Pursuits, 2012-2013", U.S. Department of Justice, Office of Justice Programs, Bureau of Justice Statistics, May 2017, pp. 1-17.

NIJ National Institute of Justice: "Technology for Pursuit Management", U.S. Department of Justice, Mar. 3, 2013, 4 pages.

* cited by examiner

*Primary Examiner* — Andrea C Leggett

(74) *Attorney, Agent, or Firm* — NK Patent Law

(57) ABSTRACT

This disclosure presents methods, systems, and devices for vehicle location tracking devices for law enforcement. In one embodiment, a device is disclosed including a printed circuit board (PCB) assembly, an enclosure assembly, and a machine readable label. The PCB assembly includes a processor, a memory electrically coupled with the processor, a real-time-clock electrically coupled with the processor; a satellite navigation receiver electrically coupled with the processor; and a first radio communication interface electrically coupled with the processor. The enclosure assembly includes a plurality of mounts for securing the PCB assembly and an attachment mechanism configured for in-motion mechanical coupling to a vehicle. The machine readable label may include a barcode, a quick response (QR) code, radio frequency identification (RFID) tag, or the like. The PCB assembly may be hermetically sealed via the enclosure assembly.

20 Claims, 5 Drawing Sheets

METHODS, DEVICES, AND SYSTEMS FOR VEHICLE TRACKING

PRIORITY CLAIM

This application claims priority to U.S. Provisional Patent Application Ser. No. 63/162,704 filed Mar. 18, 2021, entitled "VEHICLE TRACKING DEVICE,". The disclosure of the aforementioned application is incorporated herein by reference in its entirety.

TECHNICAL FIELD

The present invention relates to vehicle location tracking. More specifically this disclosure presents methods, systems, and devices for vehicle location tracking devices for law enforcement.

BACKGROUND

High-speed vehicle pursuits are likely to cause injury and can often be fatal for the driver being pursued, their passengers, and/or otherwise innocent victims on or near the road. Many high-speed vehicle pursuits occur after a routine traffic stop. The suspect typically initiates a high-speed chase during or after an officer initiated first contact with the vehicle. Most suspects slow to within 10 miles-per-hour (mph) of the posted limit in less than two minutes (National Institute of Justice, 2013) with an 80% apprehension rate without injuries, fatalities or property damage in GPS tagged cars. (National Institute of Justice, 2013.)

This is in contrast to high-speed pursuits where 15% result in a collision, 15% result in the suspect evading capture, 25% in police discontinuing (due to policy, public risk, liability etc.) and only 30% result in an apprehended suspect. (Brian A. Reaves, Ph.D., 2017.)

As such new methods, devices, and systems are needed to reduce the risks in high-speed pursuits and/or prevent extended high-speed travel of the suspect in a safe and cost efficient manner.

SUMMARY

This disclosure presents methods, systems, and devices for vehicle location for law enforcement.

In one embodiment, a device is disclosed including a printed circuit board (PCB) assembly, an enclosure assembly, and a machine readable label. The PCB assembly includes a processor, a memory electrically coupled with the processor, a real-time-clock electrically coupled with the processor; a satellite navigation receiver electrically coupled with the processor; and a first radio communication interface electrically coupled with the processor. The enclosure assembly includes a plurality of mounts for securing the PCB assembly and an attachment mechanism configured for in-motion mechanical coupling to a vehicle. The machine readable label may include a barcode, a quick response (QR) code, radio frequency identification (RFID) tag, or the like. The PCB assembly may be hermetically sealed via the enclosure assembly.

In some embodiments, the processor may be configured for receiving a first geographic coordinate from the satellite navigation receiver. The processor may be further configured for transmitting the first geographic coordinate, a device identifier (ID), and a timestamp via the first radio communication interface.

In some embodiments, the satellite navigation receiver may be configured to receive navigation signals from the Global Positioning System (GPS), the Global Navigation Satellite System (GLONASS), the BeiDou Navigation Satellite System (BDS), the Galileo Global Navigation Satellite System, the Quasi-Zenith Satellite System (QZSS), the Indian Regional Navigation Satellite System (IRNSS), and/or the like.

In some embodiments, the first radio communication interface may be configured to interface with a 2G network, a 3G network, a 4G network, a 5G network, and/or the like. The PCB assembly may further comprise a subscriber identity module (SIM) card and the device ID may be associated with the SIM card. The device ID may be associated with at least one of an integrated circuit card identifier (ICCID), an international mobile subscription identification number (IMSI), and/or the like associated with the SIM card.

In some embodiments, the first radio communication interface may be configured to communicate with a plurality of towers associated with a first network and the first network may be configured to determine a device location based on triangulation and a plurality of radio signals transmitted from the first radio communication interface and received by the plurality of towers associated with a first network.

In some embodiments, the PCB assembly may further comprise a three-axis accelerometer electrically coupled with the processor. The processor may be further configured for estimating a relative position (e.g. dead reckoning) based on motion data received from the three-axis accelerometer, and transmitting the relative position and a timestamp via the first radio communication interface. In certain embodiments, estimating the relative position may be further based on the first geographic coordinate.

In some embodiments, the PCB assembly may further comprise a second radio communication interface electrically coupled with the processor. The processor may be further configured for receiving a geographic location via the second radio communication interface and estimating the relative position may be further based on the geographic location.

The second radio communication interface may be a wireless personal area network interface (PAN) interface. In certain embodiments, the second radio communication interface may be compliant to a least one version of the Bluetooth® communication protocol. The geographic location may be received from a smart phone, a smart tablet, a smart watch, or the like. The geographic location may be determined by an application specific program resident on the smart phone, the smart tablet, the smart watch, or the like. The application specific program may also be an iOS® app, an Android® OS app, or the like.

In some embodiments, the PCB assembly may further comprise an inclinometer electrically coupled with the processor. The processor may be further configured for determining pitch data and roll data via the inclinometer upon attachment to the vehicle. The processor may also be further configured for determining de-attachment from the vehicle based on delta measurements within the pitch data and the roll data.

In some embodiments, the processor may be further configured for transmitting the first geographic coordinate, the device ID, and the timestamp over an internet protocol (IP) network to a remote tracking server. The IP network may include at least a portion of the Internet. The processor may also be further configured for transmitting the first geographic coordinate, the device ID, and the timestamp via a transmission control protocol (TCP) connection over the IP network. In other embodiments, the processor may be further configured for transmitting the first geographic coordinate, the device ID, and the timestamp via one or more User Datagram Protocol (UDP) packets over the IP network.

In some embodiments, the processor may be further configured for transmitting the first geographic coordinate, the device ID, and the timestamp via at least one of a Short Message Service (SMS) message, a Multimedia Messaging Service (MMS) message, and/or the like.

In some embodiments, the attachment mechanism may include a rare earth magnet. In still other embodiments, the attachment mechanism may include an active suction cup, a passive suction cup, and/or the like. In still other embodiments, the attachment mechanism may include an adhesive.

In some embodiments, the device may include a user interface (UI) switch and the device may be configured to initialize tracking via the UI switch. The device may also be configured to initialize tracking via a start tracking message received via the first radio communication interface and/or the second radio interface.

In some embodiments, the device may be a vehicle location tracking device for law enforcement. In further embodiments, the device may be configured to be attached to a vehicle that is prematurely exiting a law enforcement traffic stop.

In another embodiment, a method is disclosed for manufacturing a device for vehicle location tracking for law enforcement. The method includes mechanically assembling a printed circuit board (PCB) assembly with an enclosure assembly and applying a machine readable label to the enclosure assembly. The PCB assembly includes a processor, a memory electrically coupled with the processor, a real-time-clock electrically coupled with the processor; a satellite navigation receiver electrically coupled with the processor; and a first radio communication interface electrically coupled with the processor. The enclosure assembly includes a plurality of mounts for securing the PCB assembly and an attachment mechanism configured for in-motion mechanical coupling to a vehicle. The machine readable label may include a barcode, a QR code, an RFID tag, or the like.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
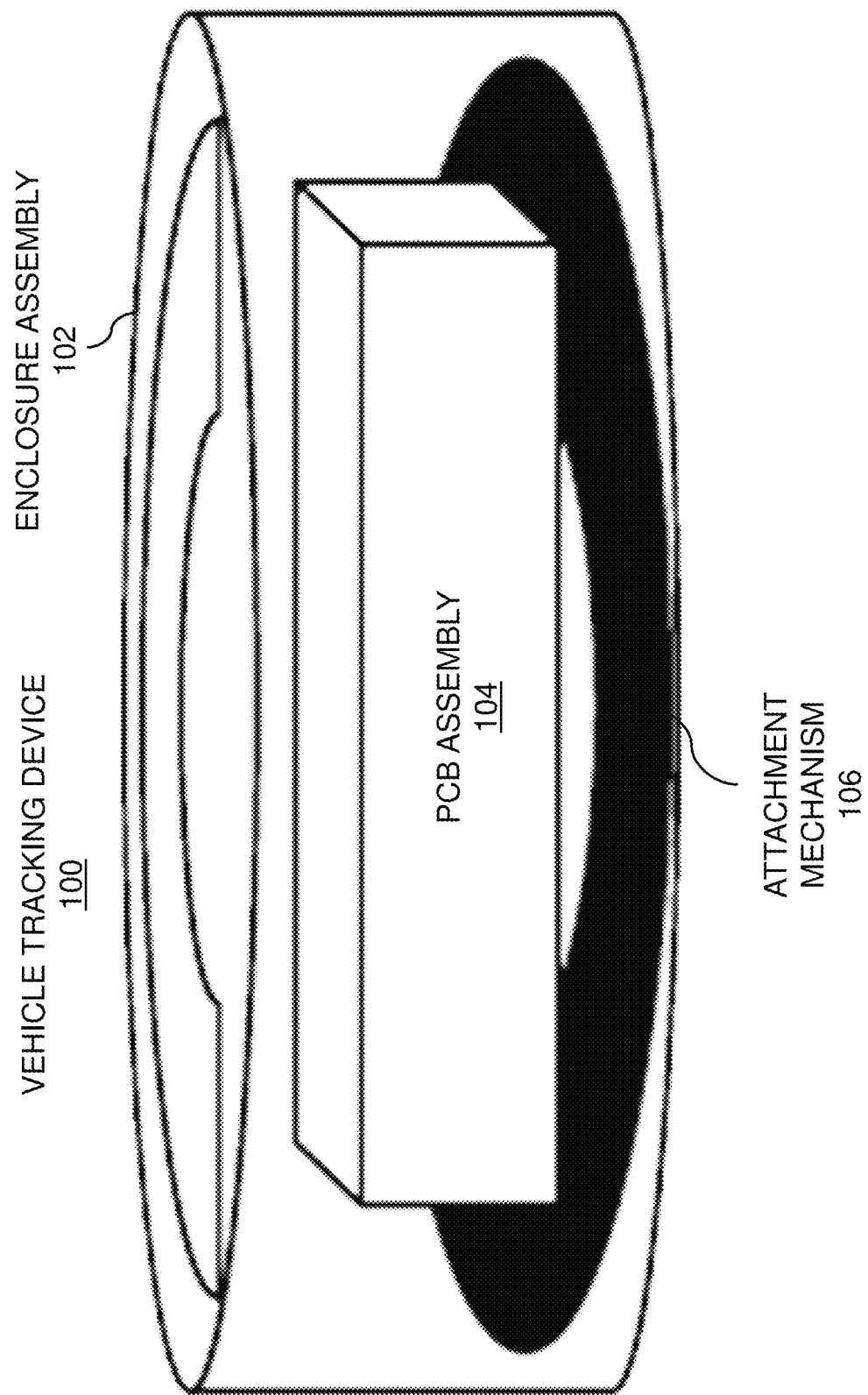
FIG. 1 depicts a diagram illustrating a vehicle tracking device including an enclosure assembly and a printed circuit board (PCB) assembly positioned within the enclosure assembly in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Over 300 people are killed each year and many thousands of drivers/passengers are injured due to high-speed vehicle pursuits. Additionally, millions of dollars are spent each year in litigation with municipalities due to these tragic events. Disclosed herein are methods, systems, and devices for vehicle location tracking for law enforcement to help reduce the occurrence of these tragic events.

FIG. 1 depicts a diagram illustrating a vehicle tracking device 100. The vehicle tracking device 100 includes an enclosure assembly 102 and a printed circuit board (PCB) assembly 104 positioned within the enclosure assembly 102. The enclosure assembly 102 includes an attachment mechanism 106 positioned on the bottom of the enclosure assembly 102. The attachment mechanism 106 may include a rare earth magnet, an active suction cup, a passive suction cup, and or the like configured for in-motion mechanical coupling to a vehicle. The rare earth magnet may include one or more neodymium rare earth magnets. In certain embodiments the rate earth magnet may have a remanence value between 1.0 and 1.5 Tesla. In other embodiments, the attachment mechanism may be an electro-magnet activated when the tracking device 100 is initialized to be deployed. In still other embodiments, attachment mechanism 106 may include a suction cup activated by a lever for deployment.

The enclosure assembly 102 may provide hermetic sealing (including waterproofing) for the PCB assembly 104. The enclosure assembly 102 may also include a machine readable label (not shown in FIG. 1). For example, the machine readable label may be positioned on the top of the enclosure assembly 102 and may include a barcode, a quick response (QR) code, a radio-frequency identification (RFID) tag, and/or the like.

The machine readable label may be used by a smart phone, a smart tablet, a smart watch, or the like for provisioning the vehicle tracking device 100. In some embodiments, the machine readable label may be replaced by using a Bluetooth® Low Energy (BLE) advertisement packet and/or an near field communications (NFC) tag identifier from circuitry on the PCB assembly 104.

Figure 2:
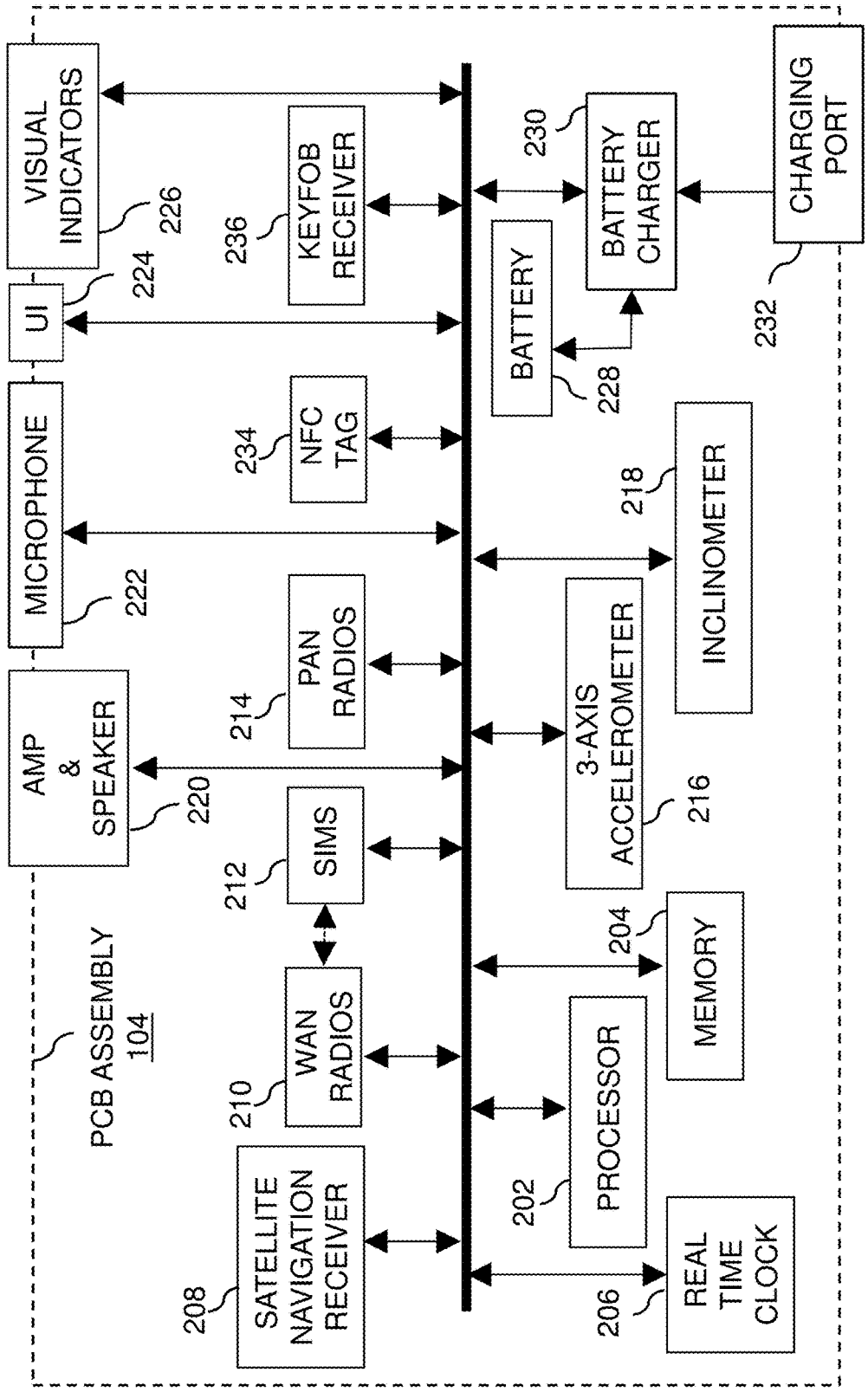
FIG. 2 depicts a block diagram illustrating the PCB assembly of the vehicle tracking device of FIG. 1 in accordance with embodiments of the present disclosure.

FIG. 2 depicts a block diagram 200 illustrating the PCB assembly 104 of the vehicle tracking device 100. The PCB assembly 104 includes a processor 202 electrically coupled with a memory 204. In some embodiments, the memory 204 or a portion of the memory 204 may be integrated with the processor 202. The memory 204 may include a combination of volatile memory and non-volatile memory. In some embodiments, the processor 202 and the memory 204 may embedded in a microcontroller. In certain embodiments, the memory 204 may include a non-volatile memory card that is field replaceable. For example, the non-volatile memory card may be a secure digital (SD) memory card. The processor 202 may be the NXP Kinetix® microcontroller unit (MCU), the Snapdragon® 4100 processor, or the like.

The PCB assembly 104 also includes a real time clock 206 for providing timestamps on determined locations. In some embodiments, the real time clock 206 may be embedded in the processor 202.

The PCB assembly 104 also includes a satellite navigation receiver 208 electrically coupled with the processor 202. The satellite navigation receiver 208 may be configured to simultaneously receive three or more satellite signals from one or more of the following navigation systems:
the Global Positioning System (GPS),
the Global Navigation Satellite System (GLONASS),
the BeiDou Navigation Satellite System (BDS),
the Galileo Global Navigation Satellite System,
the Quasi-Zenith Satellite System (QZSS), and
the Indian Regional Navigation Satellite System (IRNSS).

The PCB assembly 104 includes one or more wide area network (WAN) radios 210 electrically coupled with the processor 202. The one or more wide WAN radios 210 are configured for communication over one or more wireless networks. The one or more wireless networks may be 2G networks, 3G networks, 4G networks, 5G networks, and/or the like. The one or more wireless networks may provide connectivity between a remote tracking server and the vehicle tracking device 100. The remote tracking server may be located in a datacenter. The data center may be associated with law enforcement and/or a cloud computing environment.

The processor 202 and the memory 204 may also be configured to buffer recorded location data and associated timestamps during periods of weak or no connectivity with the one or more wireless networks.

The one or more wireless networks may be configured to determine a location of the vehicle tracking device 100 based on triangulation and a plurality of radio signals transmitted from the one or more WAN radios 210 and received by a plurality of towers associated with the one or more wireless networks. In this scenario the one or more wireless networks may communicate the triangulated location directly to the remote tracking server.

The PCB assembly 104 also includes one or more subscriber identity module (SIM) cards 212. The PCB assembly 104 has a device ID and the device ID may be associated with the one or more SIM cards 212. For example, the device ID may be associated with at least one of an integrated circuit card identifier (ICCID), an international mobile subscription identification number (IMSI), or the like.

The processor 202 may be configured to transmit a location, a timestamp, and the device ID on preprogramed intervals and/or based on a poll received from the remote tracking server. For example, the vehicle tracking device may transmit a location, a timestamp, and the device ID on one second intervals.

The PCB assembly 104 also includes one or more personal area network (PAN) radios 214. The one or more PAN radios 214 may include Bluetooth® and/or BLE technologies. In some embodiments, the PCB assembly 104 may include a universal serial bus (USB) interface to be used for charging the battery 228, uploading/downloading recorded data, and/or software updates/configurations. Additionally, the one or more PAN radios 214 may also be used for uploading/downloading recorded data, and/or software updates/configurations.

In certain embodiments, the PCB assembly 104 may also include one or more wireless local area network (WLAN) radios (not shown in FIG. 2) electrically coupled to the processor 202. The one or more WLAN radios may include Wi-Fi technologies such as 802.11a, 802.11b/g/n, and/or 802.11ac, 802.11ad, and/or the like circuitry. The one or more WLAN radios may be used for network connectivity for any of the functions described with the one or more WAN radios 210 and/or the one or more PAN radios 214.

The PCB assembly 104 also includes a three-axis accelerometer 216 and an inclinometer 218 electrically coupled with the processor 202. The three axis accelerometer 216 is configured to detect instantaneous movements on an x, y, and z-axis of the vehicle tracking device 100. The processor 202 may be further configured for estimating a relative position (e.g. dead reckoning) based on motion data received from the three-axis accelerometer 216.

The inclinometer 218 is configured to detect a relative position to gravity of the vehicle tracking device 100 including pitch data and roll data. The processor 202 may be configured for determining initial pitch data and roll data via the inclinometer 218 upon attachment to the vehicle and be further configured for determining de-attachment from the vehicle based on delta measurements within the pitch data and roll data.

The PCB assembly 104 also includes a microphone 222 electrically coupled with the processor 202. The microphone 222 may be used to detect voice communication and or ambient sounds from within the vehicle and or external to the vehicle during location tracking. The processor 202 may be configured to record the detected voice communication and or the ambient sounds. The processor 202 may be further configured to relay the detected voice communication and or the ambient sounds over the WAN radios 210 and/or the PAN radios 214.

The PCB assembly 104 (and or enclosure assembly 102) may also include a user interface (UI) 224 (e.g. a switch) and one or more visual indicators 226 electrically coupled with the processor 202. The UI 224 may be used to power on/off and/or initialize the vehicle tracking device 100. In certain embodiments the UI 224 may be a pressure switch to enable vehicle tracking device 100 when placed on a vehicle. When in an off position, the UI 244 may put the vehicle tracking device 100 in a near-zero standby power consumption mode. When in a near-zero standby power consumption mode, all recorded data, program instructions, and configuration data are maintained for future use.

The visual indicators 226 may be configured for providing a visual operating status of the vehicle tracking device 100. The visual indicators 226 may include one or more light emitting diodes (LEDs). The one or more LEDs may include one or more high intensity LEDs to be viewed by drivers and/or passengers of the vehicle, and/or witnesses to the vehicle that are not associated with the vehicle. In this scenario, the one or more high intensity LEDs may provide a deterrent to the driver of the vehicle to flee the scene of deployment. In some embodiments. the one or more LEDs may include one or more low intensity LEDs to be viewed primarily by a user (e.g. law enforcement officer) of the vehicle tracking device 100. The one or more low intensity LEDs may indicate when the vehicle tracking device 100 is powered on and/or when the vehicle tracking device 100 is securely attached to a vehicle. The one or more low intensity LEDs may also indicate a low battery status, an internal device failure, and/or network connectivity of the one or more WAN radios 210 and/or the one or more PAN radios 214. In certain embodiments, the visual indicators 226 may be interchanged for specific applications with different colors, sizes, and/or intensities based on the customer needs, city, legal, local and police agency requirements.

The PCB assembly 104 also includes an amplifier and speaker 220 electrically coupled with the processor 202. The amplifier and speaker 220 may be configured to playback pre-recorded messages and/or playback received communication over the WAN radios 210 and/or the PAN radios 214. In certain embodiments, the received communication may be received over the WAN from law enforcement (e.g. a pursuit vehicle and/or dispatch facility for law enforcement). The amplifier and speaker 220 may also be used to indicate a status of the vehicle tracking device 100 (e.g. low battery, etc.) and/or to warn potential witness or occupants of the vehicle that they are being pursued.

The PCB assembly 104 also includes a battery 228. The battery 228 may be a hot swappable battery and/or a rechargeable battery. In certain embodiments, the PCB assembly may also include a battery charger 230, and a charging port 232. The charging port 232 may be a wireless charging port. In other embodiments, the charging port 232 may be configured to be electrically coupled with a battery charging device (e.g. via a plug and/or a charging cradle). In certain embodiments, the charging port 232 may be configured to be environmentally protected when not in use (e.g. via rubber cover or other type of cap). In still other embodiments the vehicle tracking device 100 may have an attachment mechanism for an external battery to provide power to the PCB assembly 104. In some embodiments the vehicle tracking device 100 and/or an external battery charger may be configured to derive charging power from a 12 volt direct current (DC) source such as a vehicle auxiliary power outlet. In still other embodiments, the vehicle tracking device 100 and/or an external battery charger may be configured to derive charging power from a universal serial bus (USB) charging port.

The PCB assembly 104 may also include an NFC tag for secure identification to a local device such as a smart phone, a smart tablet, a smart watch, and/or the like. The PCB assembly 104 may also include a key fob receiver 236 electrically coupled to the processor 202. The key fob 236 receiver may be configured to receive a signal from a key fob transmitter to enable/disable (e.g. arm/disarm) the vehicle tracking device 100.

In still other embodiments, the PCB assembly 104 may provide an interface for an external keypad on the enclosure assembly 102. The external keypad may be used to initialize the vehicle tracking device 100 via a unique combination sequence enter by a user.

Figure 3:
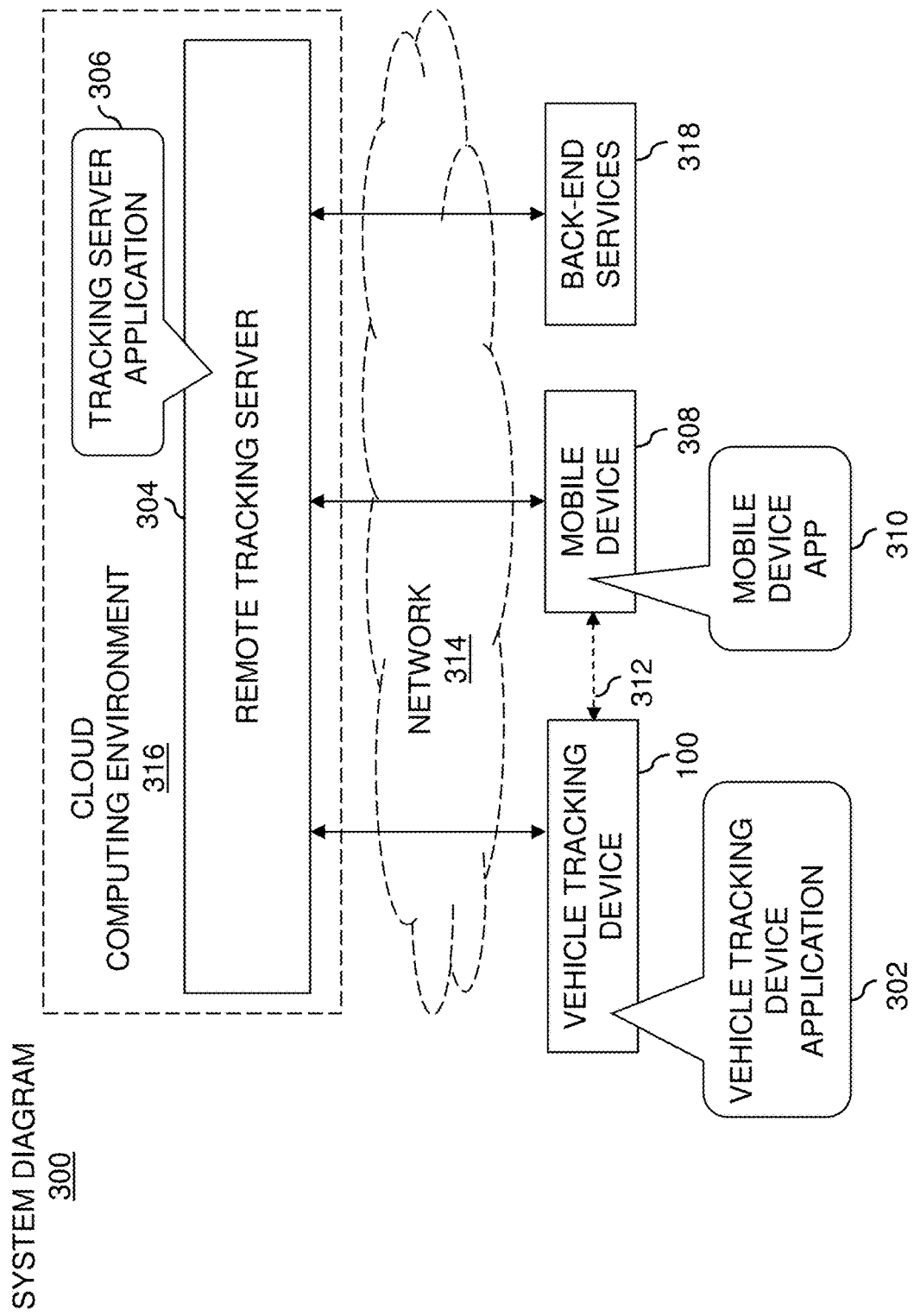
FIG. 3 depicts a system diagram illustrating the vehicle tracking device 100 of FIG. 1 executing a vehicle tracking device application, a remote tracking server executing a tracking server application, and a mobile device executing a mobile device application (app) in accordance with embodiments of the present disclosure.

FIG. 3 depicts a system diagram 300 illustrating the vehicle tracking device 100 of FIG. 1 executing a vehicle tracking device application 302, a remote tracking server 304 executing a tracking server application 306, and a mobile device 304 executing a mobile device application (app) in accordance with embodiments of the present disclosure. The vehicle tracking device 302 and the mobile device 308 are configured to communicate over a PAN 312 when in proximity. The vehicle tracking device 302 and the mobile device 308 are also configured to communicate with the remote tracking server 304 over a network 314.

The remote tracking server 304 is housed in a cloud computing environment 316. Additionally, the remote tracking server 304 is configured to send and/or receive data from one or more back-end services 318 associated with law enforcement. For example, the one or more back-end services 318 may include a given state's Department of Motor Vehicle (DMV) database, a CARFAX for Police database, an INTERPOL Stolen Motor Vehicle (SMV) database, and/or the like.

The vehicle tracking device 100 may be deployed by an officer from a traffic stop from which a majority of all high-speed pursuits begin. For example, the vehicle tracking device 100 may be simply deployed to any magnetic surface on the exterior of a vehicle without damaging the vehicle's paint while still tracking the vehicle's location. If the suspect flees, the location coordinates are recorded and sent on regular intervals to the remote tracking server 304. Once the traffic stop is peacefully terminated, the officer would then remove the vehicle tracking device 100.

The remote tracking server 304 allows one or more law enforcement officers to monitor the vehicles location, direction, and speed. The one or more law enforcement officers may monitor the vehicle on one or more fixed computing devices (e.g. personal computers, workstations, smart televisions, etc.) or by one or more mobile computing devices including mobile device 308 (e.g. smart phone, smart tablet, laptop, smartwatch, etc.) via data sent from the remote tracking server 304. In other embodiments, the vehicle tracking device 100 may communicate directly with the one or more fixed computing devices and/or the one or more mobile computing devices. In certain embodiments, the remote tracking server may communicate with one or more backend services 318 to relay information about monitored vehicles.

Law enforcement officers can then strategically pursue the vehicle safely from a small distance to apprehend the suspect without forcing the suspect to flee at high rates of speed. In general, GPS tagging has shown to be very effective in apprehension rates with little or no damage to property or individuals. Additionally, the vehicle tracking device 100 may be field deployed by a law enforcement officer to a vehicle during the beginning of a traffic stop to avoid any high-speed chases. Used in conjunction with body cameras the vehicle tracking device 100 promotes accountability for both law enforcement officers and suspects as well as promoting peaceful injury free encounters. The vehicle tracking device 100 is then detached by the law enforcement officer at the end of the traffic stop.

Figure 4:
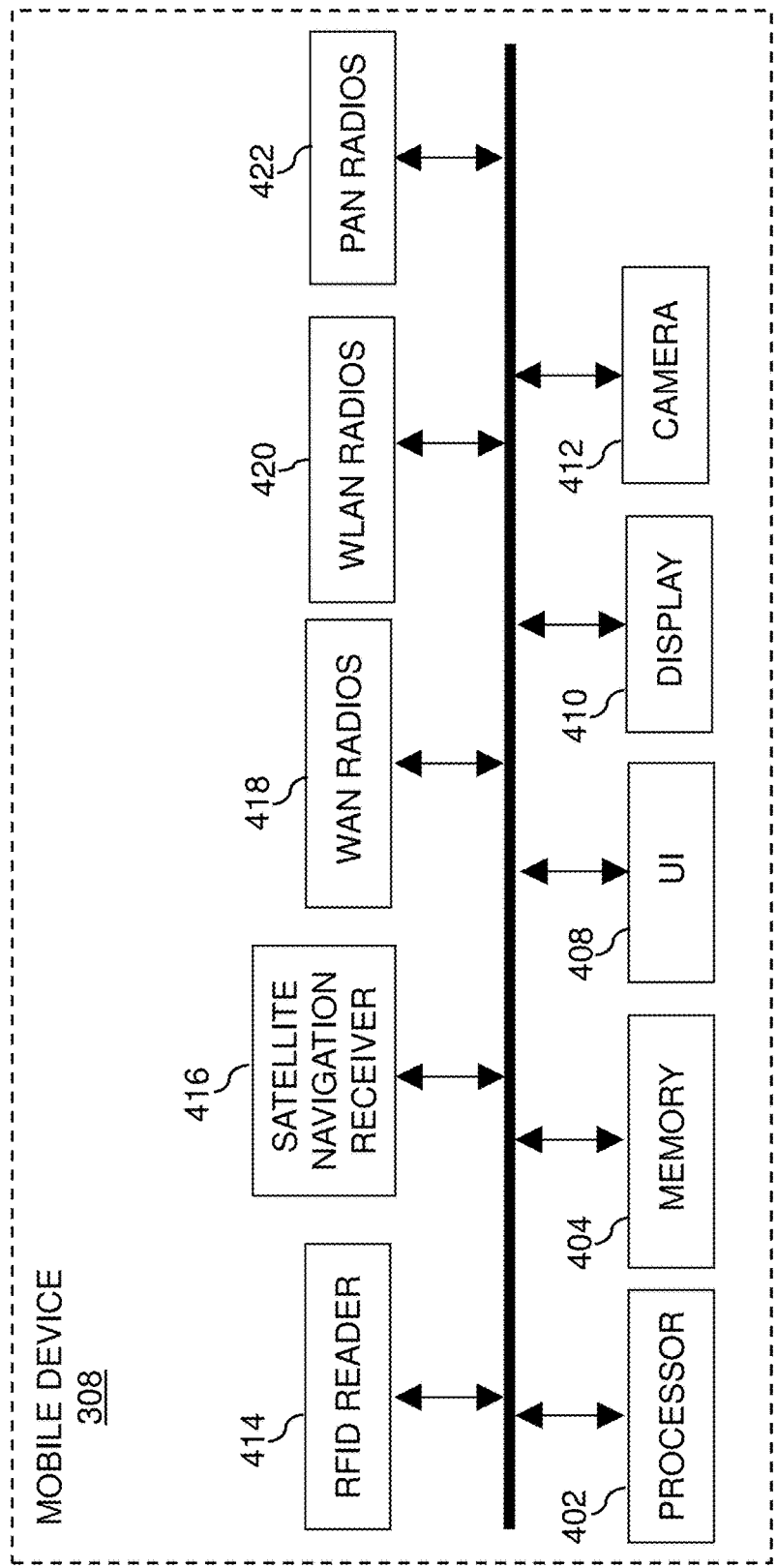
FIG. 4 depicts a block diagram illustrating the mobile device of the system diagram of FIG. 3 in accordance with embodiments of the present disclosure.

FIG. 4 depicts a block diagram 400 illustrating the mobile device 308 of the system diagram 300 of FIG. 3 in accordance with embodiments of the present disclosure. The mobile device 308 may be a smart phone (e.g., cell phone), a tablet, a laptop, a smart watch, or the like. The mobile device 308 includes a processor 402, a memory 404, a user interface (UI) 408, a display 410, a camera 412, an RFID reader 414, a satellite navigation receiver 416, WAN radios, WLAN radios 420, and PAN radios 422. The mobile device 308 also includes a battery, a battery charger, and a charging port (not shown in FIG. 4). The mobile device 208 may also in include an NFC reader (not shown in FIG. 4).

In some embodiments the memory 404 or a portion of the memory 404 may be integrated with the processor 402. The memory 408 may include a combination of volatile memory (e.g., random access memory) and non-volatile memory (e.g., flash memory). The memory 404 includes program instructions (e.g., the mobile device app 310). In certain embodiments, the processor 402 may be a mobile processor such as the Qualcomm® Snapdragon® mobile processor. For example, the processor 402 may be the Snapdragon® 855 mobile processor. In some embodiments, the UI 408 and the display 410 may be combined into a graphical user interface (GUI). For example, the GUI may be a touchpad display. The camera 412 may be used to read a QR code on the vehicle tracking device 100. The RFID reader 414 may be user to read an RFID tag on the vehicle tracking device 100.

The satellite navigation receiver 416 may be configured to simultaneously receive three or more satellite signals from one or more of the following navigation systems:
 the Global Positioning System (GPS),
 the Global Navigation Satellite System (GLONASS),
 the BeiDou Navigation Satellite System (BDS),
 the Galileo Global Navigation Satellite System,
 the Quasi-Zenith Satellite System (QZSS), and
 the Indian Regional Navigation Satellite System (IRNSS).

The WAN radios 418 are configured for communication over one or more wireless networks. The one or more wireless networks may be 2G networks, 3G networks, 4G networks, 5G networks, and/or the like. The WLAN radios 420 may include Wi-Fi technologies such as 802.11a, 802.11b/g/n, and/or 802.11ac, 802.11ad, and/or the like circuitry. The one or more WLAN radios may be used for network connectivity for any of the functions described with the one or more WAN radios 210 and/or the one or more PAN radios 214. The PAN radios 422 may include Bluetooth® and/or BLE technologies.

Figure 5:
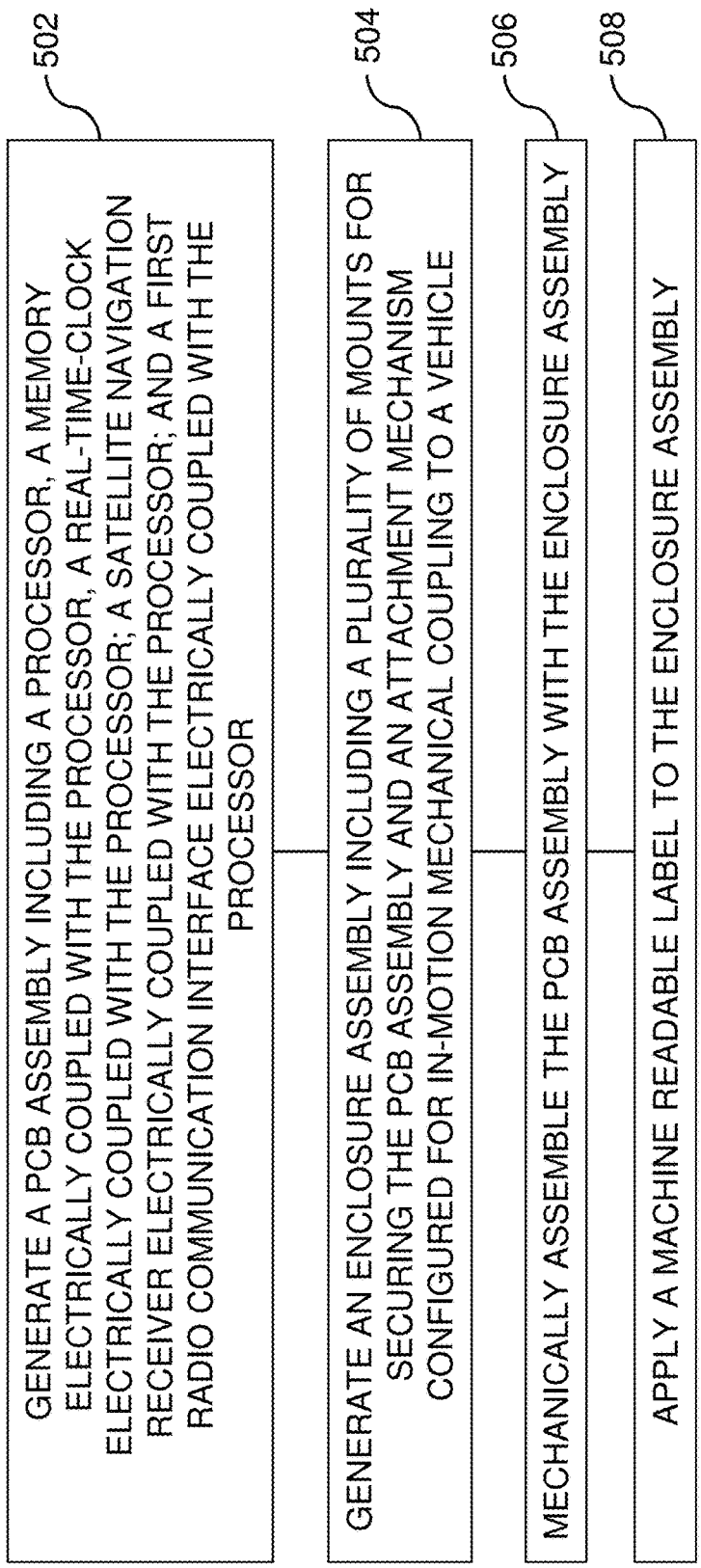
FIG. 5 depicts a flowchart illustrating a method of manufacturing the vehicle tracking device of FIG. 1 in accordance with embodiments of the present disclosure.

FIG. 5 depicts a flowchart 500 illustrating a method of manufacturing the vehicle tracking device 100 of FIG. 1 in accordance with embodiments of the present disclosure.

In step 502, the method includes generating a PCB assembly including a processor, a memory electrically coupled with the processor, a real-time-clock electrically coupled with the processor; a satellite navigation receiver electrically coupled with the processor; and a first radio communication interface electrically coupled with the processor (e.g., the PCB assembly of FIG. 2).

In step 504, the method further includes generating an enclosure assembly including a plurality of mounts for securing the PCB assembly and an attachment mechanism configured for in-motion mechanical coupling to a vehicle (e.g., the enclosure assembly 102 of FIG. 2).

In step 506, the method further includes mechanically assembling the PCB assembly with the enclosure assembly.

In step 508, the method further includes applying a machine readable label to the enclosure assembly Other features of the vehicle tracking device 100 may include the ability to upload and/or download in the field a portion and/or all of the contents of the memory 204 via the PAN radios 214, the WAN radios 210, and/or a physical communication port (e.g. a USB port, etc.) For example an operating system (OS), a device specific application, device configuration data, and/or device recorded data may be field uploaded and/or downloaded over the network and/or to a localized mobile device.

In some embodiments, the vehicle tracking device 100 may be used as a permanently attached transponder of a vehicle for other purposes. Such as to also provide data as standalone or supplemental from a chasing vehicle with or without a tracking device in use that can be used to map location data of any consumer/patrol vehicles to the remote tracking server. Additionally, signal repeaters may be deployed on pursuit vehicles to facilitate relays of data transmissions from the vehicle tracking device 100 to the one or more wireless networks. In certain embodiments, multiple vehicle tracking devices may have mesh networking capabilities.

The vehicle tracking device 100 is a reusable device and is configured to be deployed by hand (versus being launched from a pursuit vehicle). As such, there is less risk to property or individuals when deployed. The vehicle tracking device 100 may also provide a proactive deterrent to a chase even before it begins. Additionally, the vehicle tracking device 100 may indicate by audible or visual means to potential witnesses that the vehicle is being pursued.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle tracking device comprising:
    a printed circuit board (PCB) assembly comprising:
        a processor;
        a memory electrically coupled with the processor;
        a real-time-clock electrically coupled with the processor;
        a satellite navigation receiver electrically coupled with the processor; and
        a first radio communication interface electrically coupled with the processor;
    an enclosure assembly comprising:
        a plurality of mounts for securing the PCB assembly; and
        an attachment mechanism configured for:
            temporary non-damaging hand deployed mechanical coupling to a suspect's vehicle exterior by a law enforcement officer during a beginning and an in-motion premature exit of a traffic stop; and
            non-damaging decoupling from the suspect's vehicle exterior by
        the law enforcement officer upon a peaceful termination of the traffic stop; and
    a machine readable label.

2. The vehicle tracking device of claim 1, wherein the processor is configured for:
    receiving a first geographic coordinate from the satellite navigation receiver; and
    transmitting to a cellular network the first geographic coordinate, a device identifier (ID), and a timestamp via the first radio communication interface.

3. The vehicle tracking device of claim 2, wherein:
    the first radio communication interface is configured to communicate with a plurality of towers associated with a first network; and
    the first network is configured to determine a device location based on triangulation and a plurality of radio signals transmitted from the first radio communication interface and received by the plurality of towers associated with a first network.

4. The vehicle tracking device of claim 3, wherein:
    the PCB assembly further comprises a three-axis accelerometer electrically coupled with the processor; and
    the processor is further configured for:
        estimating a relative position based on motion data received from the three-axis accelerometer and transmitting the relative position via the first radio communication interface; and
        for transmitting the relative position and a timestamp via the first radio communication interface.

5. The vehicle tracking device of claim 4, wherein estimating the relative position is further based on the first geographic coordinate.

6. The vehicle tracking device of claim 5, wherein:
    the PCB assembly further comprises a second radio communication interface electrically coupled with the processor;
    the processor is further configured for:
        receiving a geographic location via the second radio communication interface; and
        estimating the relative position is further based on the geographic location.

7. The vehicle tracking device of claim 6, wherein:
    the second radio communication interface is a wireless personal area network interface (PAN) interface; and
    the geographic location is received from at least one of a smart phone and a smart tablet.

8. The vehicle tracking device of claim 2, wherein:
    the PCB assembly further comprises an inclinometer electrically coupled with the processor; and
    the processor is further configured for:
        determining pitch data and roll data via the inclinometer upon attachment to the vehicle; and determining de-attachment from the vehicle based on delta measurements within the pitch data and roll data.

9. The vehicle tracking device of claim 2, wherein the processor for is further configured for transmitting the first geographic coordinate, the ID, and the timestamp over an internet protocol (IP) network to a remote tracking server.

10. The vehicle tracking device of claim 2, wherein the processor is further configured for transmitting the first geographic coordinate, the ID, and the timestamp via at least one of a Short Message Service (SMS) message and a Multimedia Messaging Service (MMS) message.

11. The vehicle tracking device of claim 2, wherein the attachment mechanism includes at least one of a rare earth magnet, an active suction cup, a passive suction cup, and an adhesive.

12. The vehicle tracking device of claim 2, wherein the machine readable label includes at least one of a barcode, a quick response (QR) code, and a radio-frequency identification (RFID) tag.

13. The vehicle tracking device of claim 2 further comprising a user interface (UI) switch, wherein the device is configured to initialize tracking via the UI switch.

14. The vehicle tracking device of claim 2, wherein the device is configured to initialize tracking via a start tracking message received via the first radio communication interface.

15. The vehicle tracking device of claim 2, wherein:
the PCB assembly further comprises a second radio communication interface electrically coupled with the processor; and
the device is configured to initialize tracking via a start tracking message received via the second radio communication interface.

16. The vehicle tracking device of claim 15, wherein:
the second radio communication interface is a wireless personal area network interface (PAN) interface; and
the start tracking message is received from at least one of a smart phone and a smart tablet.

17. The vehicle tracking device of claim 1, wherein the PCB assembly is hermetically sealed via the enclosure assembly.

18. The vehicle tracking device of claim 1 further comprising an amplifier and a speaker electrically coupled with the processor, wherein the processor is configured for playing prerecorded messages.

19. The vehicle tracking device of claim 1 further comprising an amplifier and a speaker electrically coupled with the processor, wherein the processor is configured for playing received communications from the first radio communication interface.

20. A method of manufacturing a vehicle tracking device, the method comprising:
mechanically assembling a printed circuit board (PCB) assembly with an enclosure assembly, wherein:
the PCB assembly comprises:
a processor;
a memory electrically coupled with the processor;
a real-time-clock electrically coupled with the processor;
a satellite navigation receiver electrically coupled with the processor; and
a first radio communication interface electrically coupled with the processor;
and
the enclosure assembly comprises:
a plurality of mounts for securing the PCB assembly; and
an attachment mechanism configured for:
temporary non-damaging hand deployed mechanical coupling to a suspect's vehicle exterior by a law enforcement officer during a beginning and an in-motion premature exit of a traffic stop; and
non-damaging decoupling from the suspect's vehicle exterior by the law enforcement officer upon a peaceful termination of the traffic stop;
and
applying a machine readable label to the enclosure assembly.

* * * * *